US009486916B1

(12) United States Patent
Wyman

(10) Patent No.: US 9,486,916 B1
(45) Date of Patent: Nov. 8, 2016

(54) PUSH-PULL TOOL

(71) Applicant: Kenneth E. Wyman, Hanna City, IL (US)

(72) Inventor: Kenneth E. Wyman, Hanna City, IL (US)

( * ) Notice: Subject to any disclaimer, the term of this patent is extended or adjusted under 35 U.S.C. 154(b) by 0 days.

(21) Appl. No.: 14/859,605

(22) Filed: Sep. 21, 2015

(51) Int. Cl.
*B25J 1/04* (2006.01)

(52) U.S. Cl.
CPC .................................... *B25J 1/04* (2013.01)

(58) Field of Classification Search
CPC .................................................... B25J 1/04
USPC ......... 294/9, 10, 14, 24, 175, 191, 209, 210; 172/375
See application file for complete search history.

(56) References Cited

U.S. PATENT DOCUMENTS 2,785,483 A * 3/1957 Gajewski ................ A01B 1/20 172/375
3,048,139 A * 8/1962 Duckett .................. B63B 17/00 114/221 R
3,843,981 A * 10/1974 Verest ..................... B25B 25/00 254/131
4,037,554 A * 7/1977 Foscolo .................. B63B 21/54 114/221 R
4,624,494 A * 11/1986 Huppert ..................... B25J 1/04 294/175
5,018,773 A * 5/1991 Stavin ..................... B27B 25/10 294/209
5,116,093 A * 5/1992 Burns .................... A62B 99/00 294/23.5
5,575,470 A * 11/1996 Sherman ............. A63B 63/083 294/175
6,460,910 B2 * 10/2002 Prass ......................... B25F 1/00 200/331
7,334,825 B1 * 2/2008 Sammon .................. B25H 5/00 294/24
7,673,912 B2 * 3/2010 Breininger ................ B25B 9/00 294/210
8,291,996 B2 * 10/2012 Hoang ..................... A01B 1/12 172/375
2003/0051305 A1 * 3/2003 Hewlett .............. E04D 13/0765 15/236.04
2007/0018467 A1 * 1/2007 Schwartz ................ A47F 13/06 294/210
2011/0025081 A1 * 2/2011 Boyum ................... A47F 13/06 294/175

* cited by examiner

*Primary Examiner* — Dean Kramer
(74) *Attorney, Agent, or Firm* — Anthony Y. Wen; Neal, Gerber & Eisenberg LLP

(57) ABSTRACT

A push-pull tool is described that can assist a user with the pushing and pulling of objects, such as when loading, unloading, and moving objects in vehicle cargo areas. The tool includes a handle that is detachably connectable to various interchangeable components for pushing and pulling such objects. By using a suitable component of the push-pull tool, the user can easily and quickly push and pull many types of objects, including those that are unwieldy, heavy, or large.

20 Claims, 22 Drawing Sheets

PUSH-PULL TOOL

TECHNICAL FIELD

This application generally relates to a tool to assist a user with the pushing and pulling of objects, such as when loading, unloading, and moving objects in vehicle cargo areas. In particular, this application relates to a tool having a handle that is detachably connectable to various interchangeable head and hook components for pushing and pulling such objects.

BACKGROUND

Most vehicles have cargo areas for storing objects in addition to seating areas for passengers. The vehicles may include pickup trucks that have cargo beds that are typically long with low sides and a tailgate, and may be covered or uncovered. It can be difficult for a person to load, unload, and move objects in a cargo bed due to the length of the cargo bed and/or if the cargo bed is covered. Common ways to load, unload, and move objects in a cargo bed include climbing into the cargo bed and reaching over the side. However, these methods can be cumbersome and lead to injuries, particularly if the objects are heavy or unwieldy. In addition, these methods may not always be practical for people with physical, strength, and/or mobility issues.

Accordingly, there is an opportunity for a tool that addresses these concerns. More particularly, there is an opportunity for a push-pull tool having a handle that is detachably connectable to various interchangeable head and hook components for pushing and pulling objects, such as in the cargo areas of vehicles.

SUMMARY

The invention is intended to solve the above-noted problems by providing a push-pull tool that is designed to, among other things: (1) assist a user in loading, unloading, and moving objects in vehicle cargo areas; (2) provide head components for the pushing of objects; (3) provide a hook component for the pulling of objects; and (4) enable easy and quick attaching and detaching of the components to a handle of the tool.

In one embodiment, a tool includes a handle and a component detachably connectable to the handle. The handle may include an elongated shaft having an attachment portion on a first end, and the handle may define a longitudinal axis of the tool. The component may include a horizontal portion and a transverse portion. The horizontal portion of the component may include a receiving socket that is detachably connectable to the attachment portion of the handle. The receiving socket may open on a first surface of the horizontal portion and be in-line with the handle along the longitudinal axis of the tool. The transverse portion of the component may extend from the horizontal portion and be transverse to the longitudinal axis of the tool. The transverse portion may have a second surface substantially parallel to and opposite of the first surface.

In another embodiment, a tool includes a handle and a hook component detachably connectable to the handle. The handle may include an elongated shaft having an attachment portion on a first end, and the handle may define a longitudinal axis of the tool. The hook component may include a horizontal portion and a transverse portion. The horizontal portion of the hook component may include a receiving socket that is detachably connectable to the attachment portion of the handle. The receiving socket may open on a first surface of the horizontal portion and be in-line with the handle along the longitudinal axis of the tool. The transverse portion of the hook component may extend from the horizontal portion at an angle with respect to the longitudinal axis of the tool. The transverse portion may have a second surface substantially perpendicular to the first surface and parallel to the longitudinal axis of the tool.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
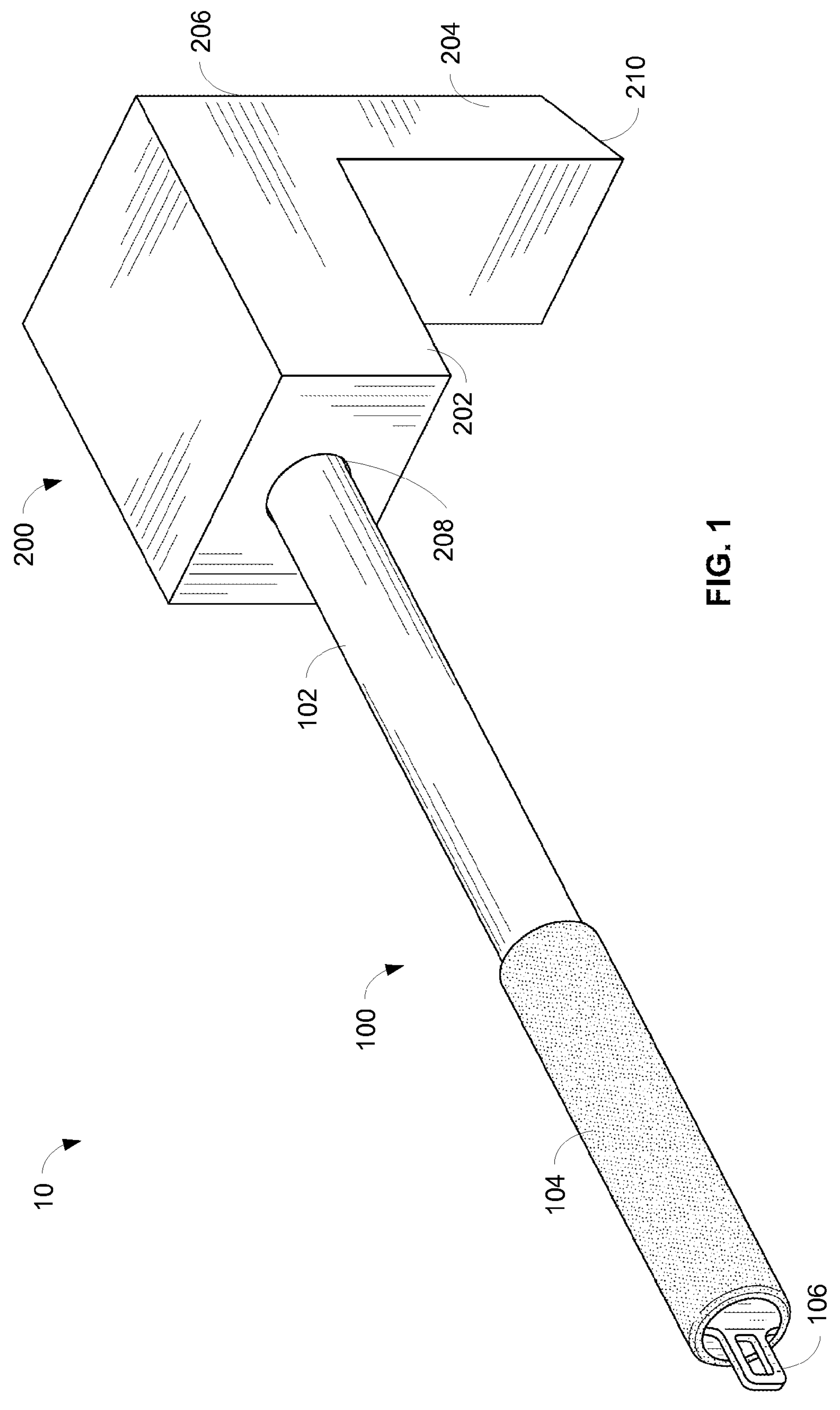
FIG. 1 is a perspective view of an embodiment of a push-pull tool having a handle attached to a first head component.
Figure 2:
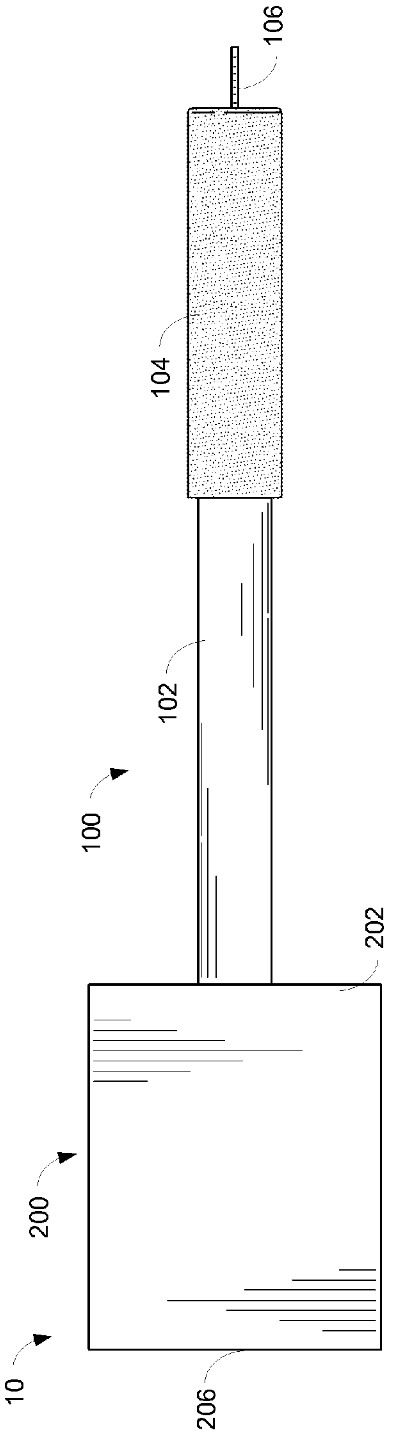
FIG. 2 is a top plan view of the push-pull tool of FIG. 1.
Figure 3:
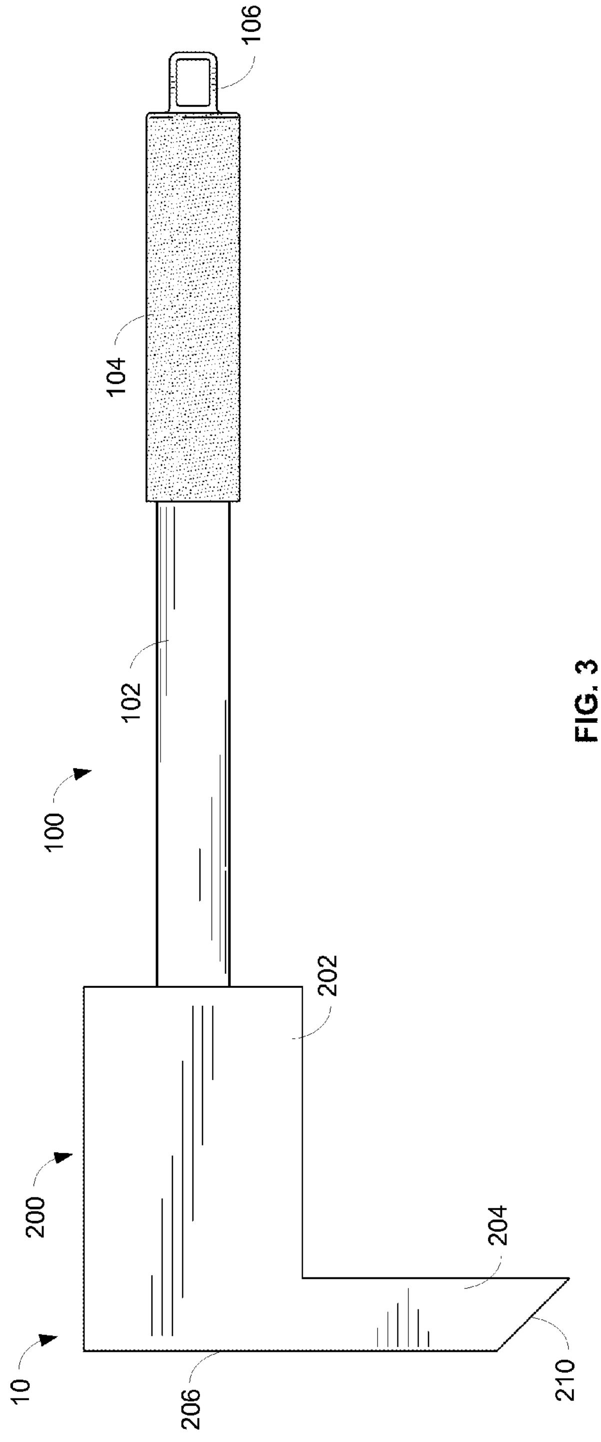
FIG. 3 is a side elevational view of the push-pull tool of FIG. 1.
Figure 4:
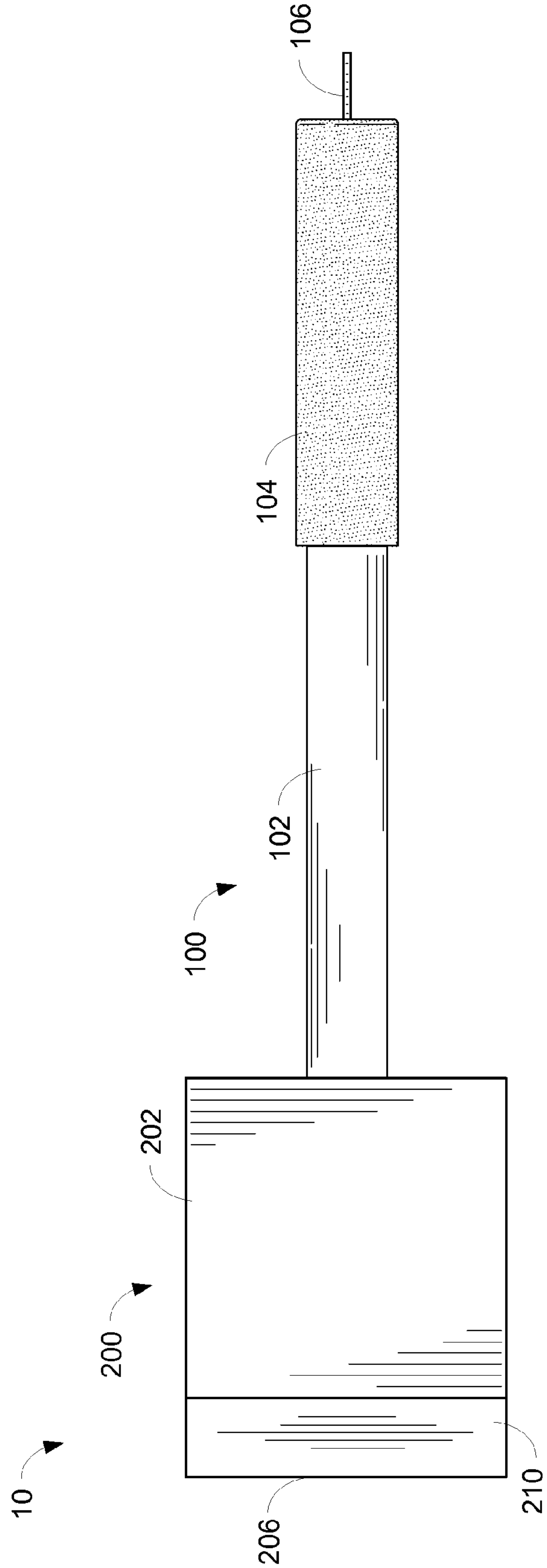
FIG. 4 is a bottom plan view of the push-pull tool of FIG. 1.
Figure 5:
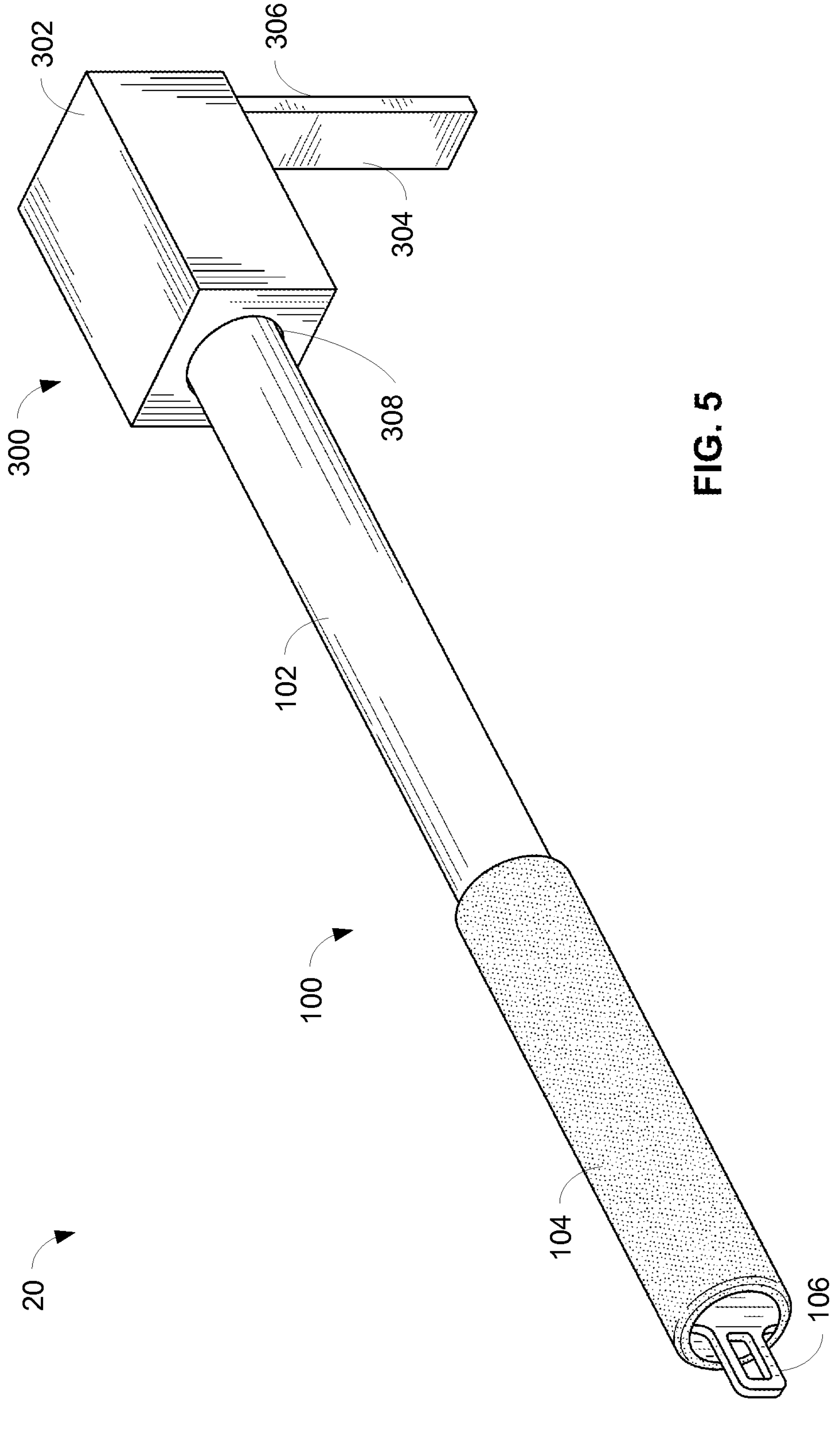
FIG. 5 is a perspective view of an embodiment of a push-pull tool having a handle attached to a second head component.
Figure 6:
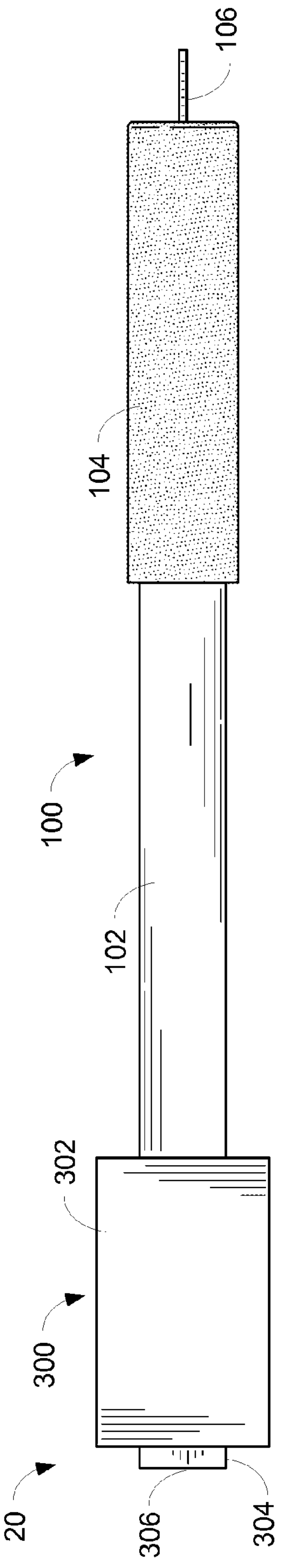
FIG. 6 is a top plan view of the push-pull tool of FIG. 5.
Figure 7:
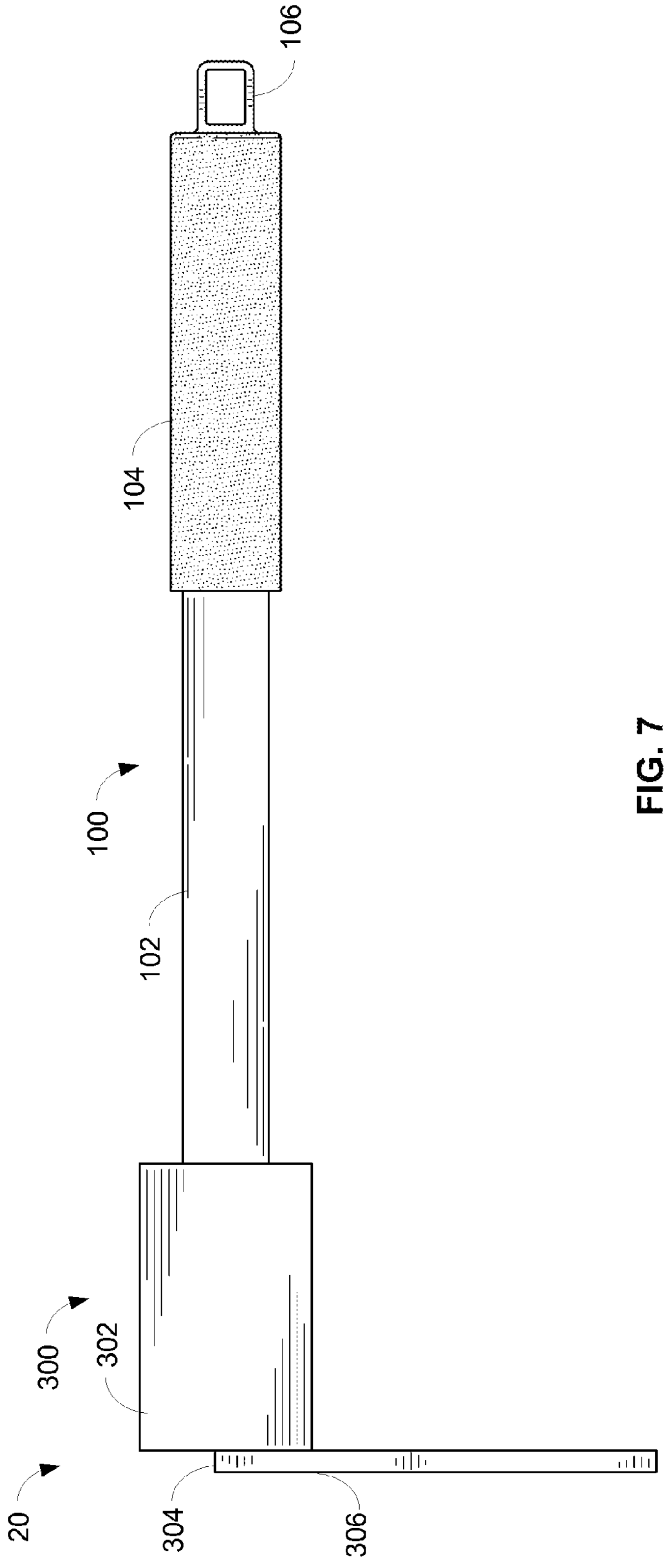
FIG. 7 is a side elevational view of the push-pull tool of FIG. 5.
Figure 8:
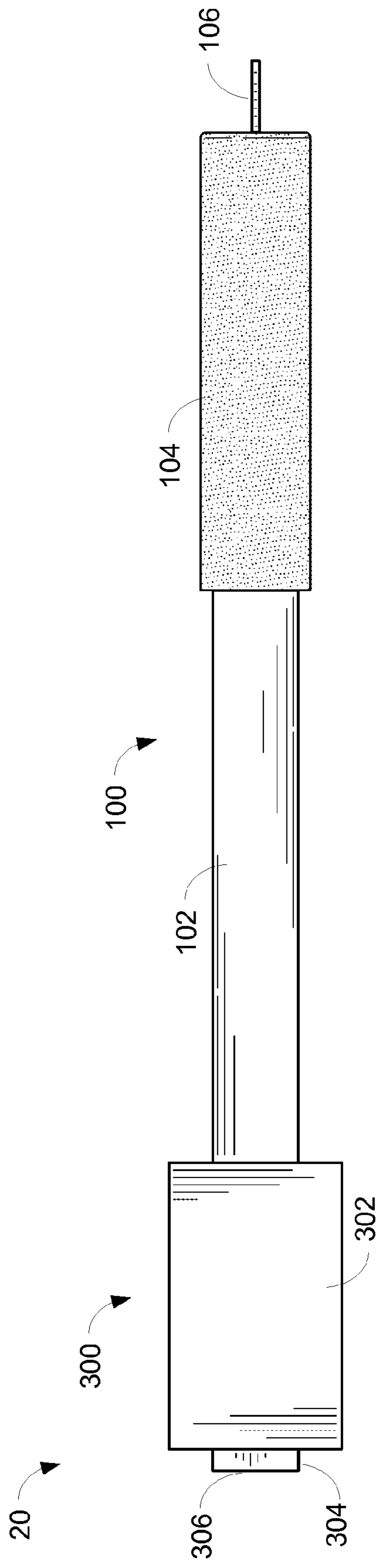
FIG. 8 is a bottom plan view of the push-pull tool of FIG. 5.
Figure 9:
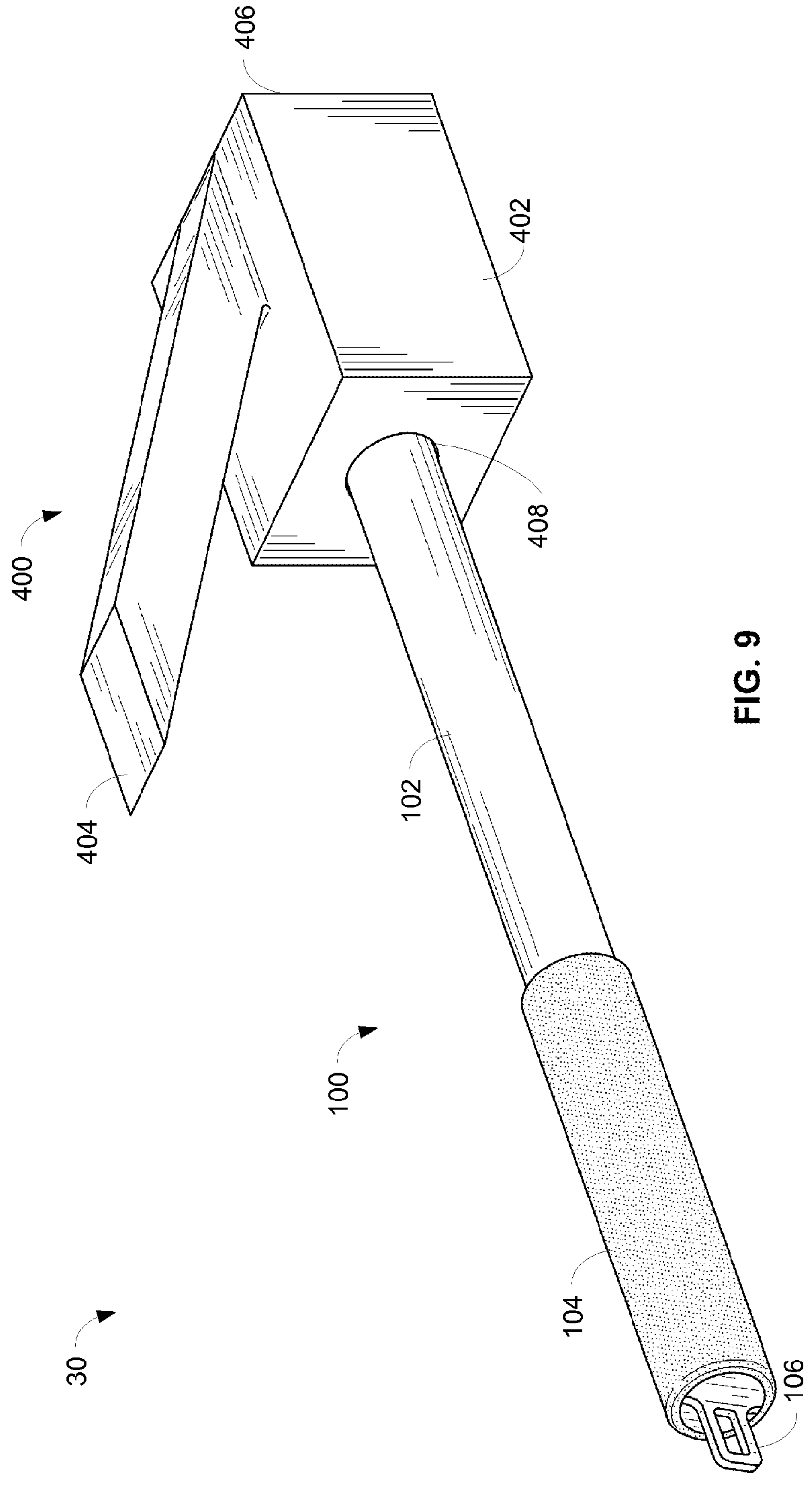
FIG. 9 is a perspective view of an embodiment of a push-pull tool having a handle attached to a hook component.
Figure 10:
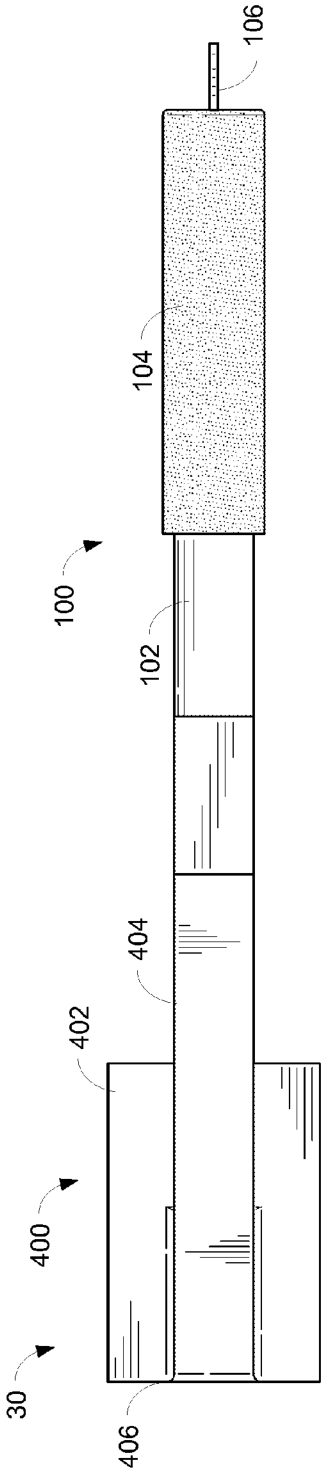
FIG. 10 is a top plan view of the push-pull tool of FIG. 9.
Figure 11:
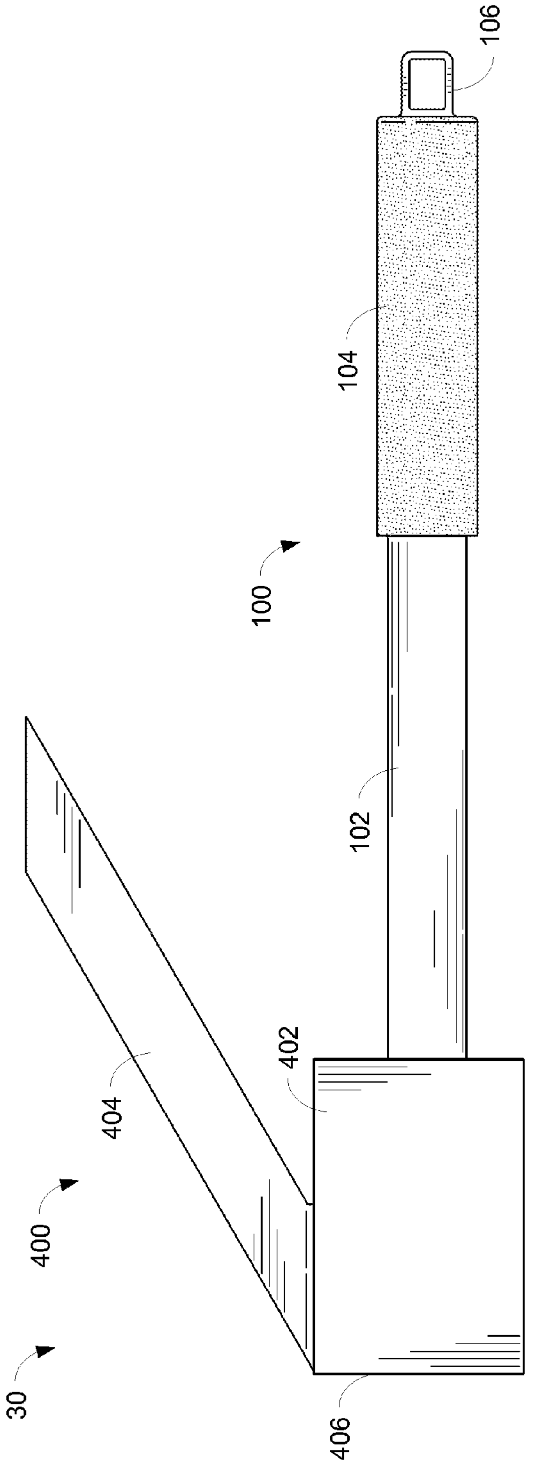
FIG. 11 is a side elevational view of the push-pull tool of FIG. 9.
Figure 12:
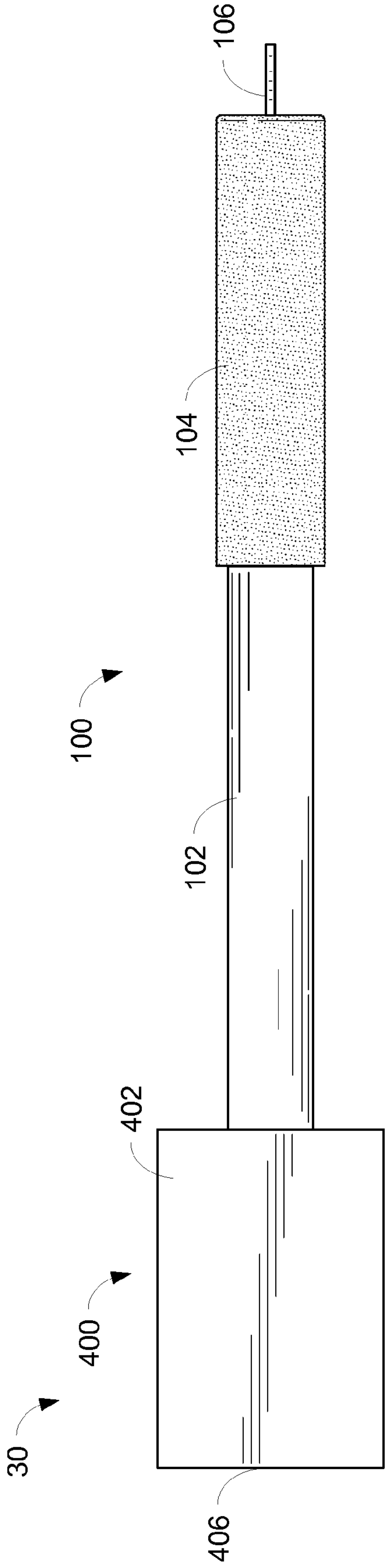
FIG. 12 is a bottom plan view of the push-pull tool of FIG. 9.

The description that follows describes, illustrates and exemplifies one or more embodiments of the invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

The push-pull tool described herein can assist a user in loading, unloading, and/or moving objects, such as in vehicle cargo areas. The user can use the push-pull tool while positioned outside of the vehicle, such as standing on the ground at the tailgate of a pickup truck, for example, and therefore does not need to enter the cargo area. While the push-pull tool is particularly useful for loading, unloading, and moving objects in long cargo beds of pickup trucks, the push-pull tool can also be used in numerous other environments. The push-pull tool may include a handle that is attachable to various interchangeable components for pushing, pulling, and moving objects. The interchangeable components can include head components for pushing and moving objects, and hook components for hooking onto objects to pull and move them. For example, a user may wish to load, unload, or move objects such as bags, boxes, bricks, luggage, and furniture from the cargo area of their vehicle. By using a suitable component of the push-pull tool, the user can easily and quickly push and pull such objects using a head component or hook component. The push-pull tool may push objects, for example, by contacting the objects using an outer-facing surface of a component. Objects may be pulled by the push-pull tool, for example, by hooking onto a part of the object, such as a bag handle or opening in a box.

FIGS. 1-4 show various views of an embodiment of a push-pull tool 10 having a handle 100 that is removably attached to a head component 200. In particular, the push-pull tool 10 is shown in a perspective view in FIG. 1, in a top plan view in FIG. 2, in a side elevational view in FIG. 3, and in a bottom plan view in FIG. 4. A user may use the push-pull tool 10 to push and move objects by holding the handle 100 to manipulate the head component 200 to contact the objects with an outer-facing surface 206 of the head component 200.

Figure 13:
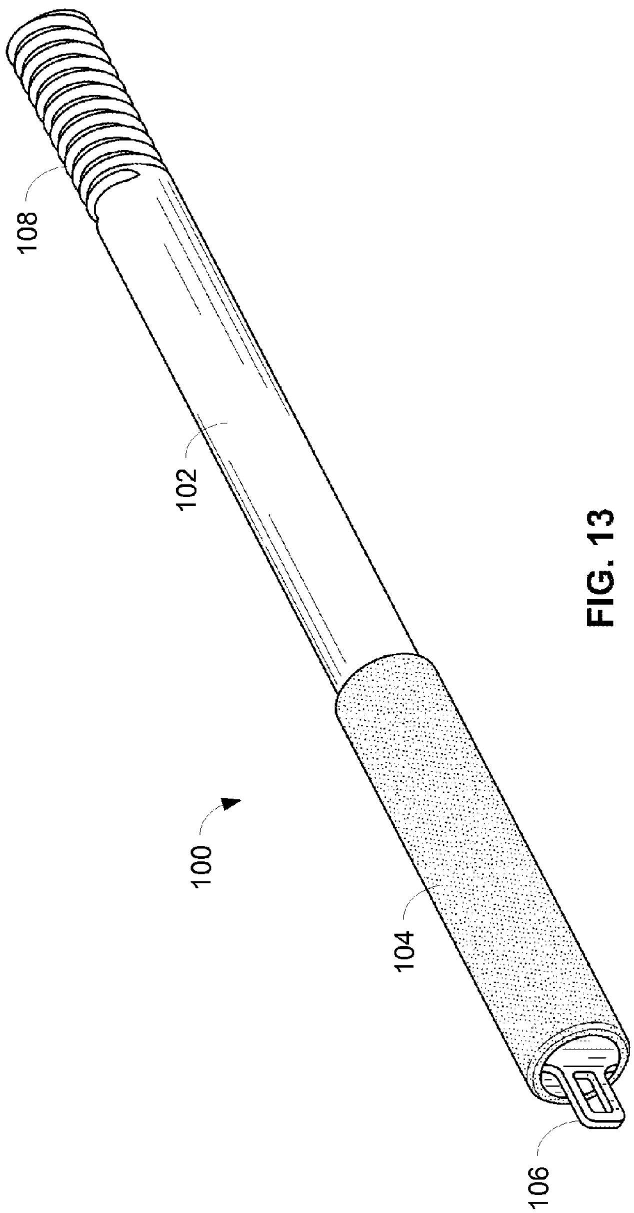
FIG. 13 is a perspective view of an embodiment of a handle of a push-pull tool.
Figure 14:
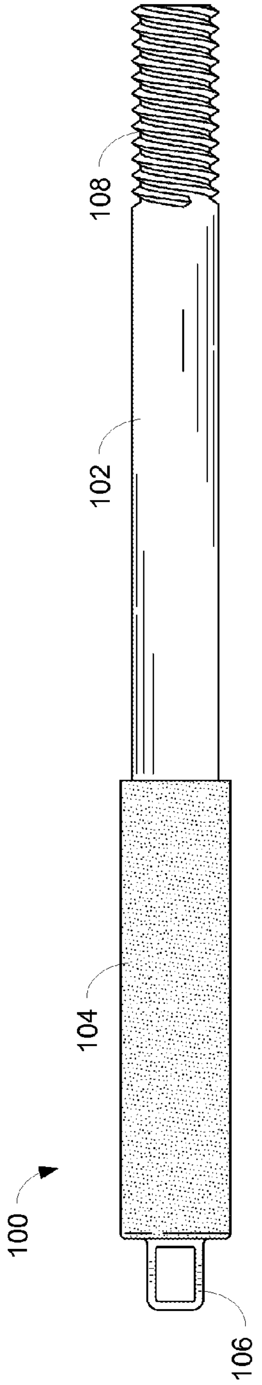
FIG. 14 is a side elevational view of the handle of FIG. 13.

The handle 100 may allow a user to hold and manipulate the push-pull tool 10. The handle 100 is shown without an attached component in the perspective and side elevational views of FIGS. 13-14. The handle 100 may primarily be comprised of a shaft 102. The shaft 102 may be tubular, cylindrical, square, or another shape; may be made of steel, aluminum, plastic, and/or another suitable material; and may be hollow or solid. A graspable portion 104 of the handle 100 may be covered with a grip material to assist a user in securely grasping the handle 100. The grip material may be composed of, for example, foam, rubber, synthetic, and/or other suitable materials, so that the graspable portion 104 is non-slip, resists slippage, and/or has a tactile feel. The graspable portion 104 may be cushioned, in some embodiments, to provide a more comfortable area for a user to hold.

The length of the handle 100 may vary, depending on the particular application the tool is being used for. Accordingly, the length of the push-pull tool 10 may be primarily influenced by the length of the handle 100 because the handle 100 makes up a substantial portion of the length of the push-pull tool 10. For example, the handle 100 may be of differing lengths to be suitable for use in vehicle cargo areas having different lengths. In some embodiments, the handle 100 may include an opening 106 to allow the push-pull tool 10 to be hung for storage purposes.

Male threading 108 may be formed on one end of the handle 100 to allow secure attachment of the handle 100 to a component. The component may include the head component 200 of the push-pull tool 10 shown in FIGS. 1-4. Other embodiments of the push-pull tool 20, 30 are depicted in FIGS. 5-8 (for a different head component 300) and FIGS. 9-12 (for a hook component 400), respectively, and described below. It should be noted that the handle 100 of the push-pull tools 20, 30 is depicted as being the same as the handle 100 of the push-pull tool 10 described above, and as such, will not be discussed in any detail with respect to the push-pull tools 20, 30. The handle 100 may accordingly be attached to the head component 300 and the hook component 400 of the push-pull tools 20, 30, respectively, using the male threading 108. The male threading 108 may mate with corresponding female threading in the head component 200, head component 300, and hook component 400. The male threading 108 may be integrally formed on the handle 100 or may be separate. The male threading 108 may be composed of metal, plastic, or any suitable material. Although male threading 108 is shown on the handle 100, other ways of securing the handle 100 to a component may be utilized. For example, the handle 100 may be secured to a component using bayonet mounting with a male pin that mates with a matching L-shaped female slot receptor; using a pin to secure an end of the handle 100 that has been inserted into a component; or using a spring button on an end of the handle 100 that mates with an opening of the component.

The head component 200 of the push-pull tool 10 is shown without the handle 100 attached in various views in FIGS. 15-21. In particular, the head component 200 is shown in a perspective view in FIG. 15, a front elevational view in FIG. 16, a rear elevational view in FIG. 17, a side elevational view in FIG. 18, a top plan view in FIG. 19, a bottom plan view in FIG. 20, and a cross-sectional side view in FIG. 21. The head component 200 may include a horizontal portion 202 and a transverse portion 204 that extends from the horizontal portion 202. The transverse portion 204 may extend generally perpendicularly from the horizontal portion 202, for example, or may extend at a different angle from the horizontal portion 202. In some embodiments, the horizontal portion 202 may be integral with the transverse portion 204. In other embodiments, the horizontal portion 202 may be formed separately from the transverse portion 204. The head component 200 may be composed of non-marring plastic to protect the object and surfaces of the vehicle cargo area that the head component 200 may come in contact with. In some embodiments, the head component 200 may be composed of metal or another suitable material.

The horizontal portion 202 may include female threading 208 which mates with the male threading 108 of the handle 100 to attach the handle 100, as best shown in FIGS. 1, 15, 17, and 21. The female threading 208 may be of a suitable depth to match the length of the male threading 108, and to ensure secure attachment of the head component 200 with the handle 100. In some embodiments, the female threading 208 may be a threaded receiver, and in other embodiment, the female threading 208 may be machined into the head component 200.

Figure 15:
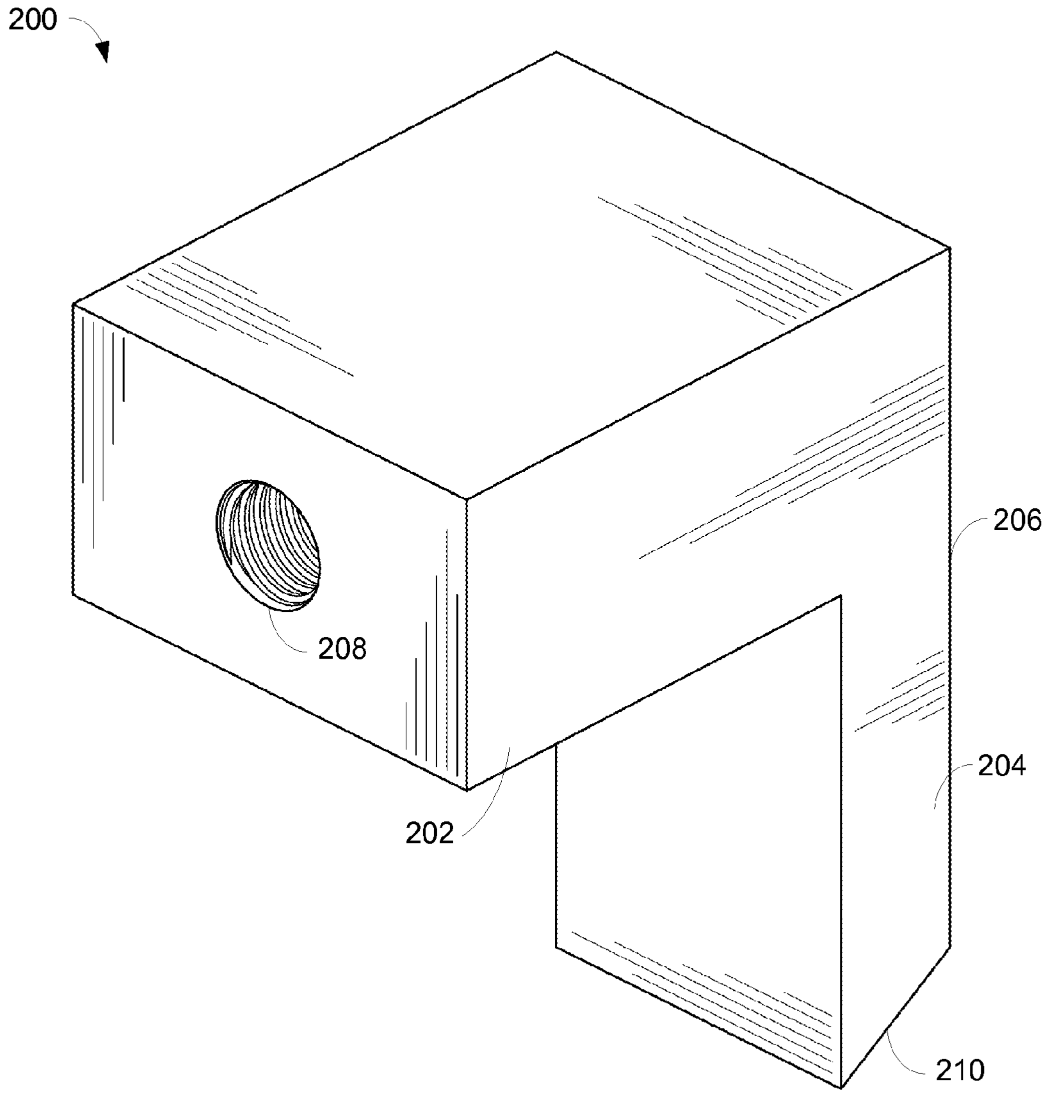
FIG. 15 is a perspective view of an embodiment of a first head component of a push-pull tool.
Figure 16:
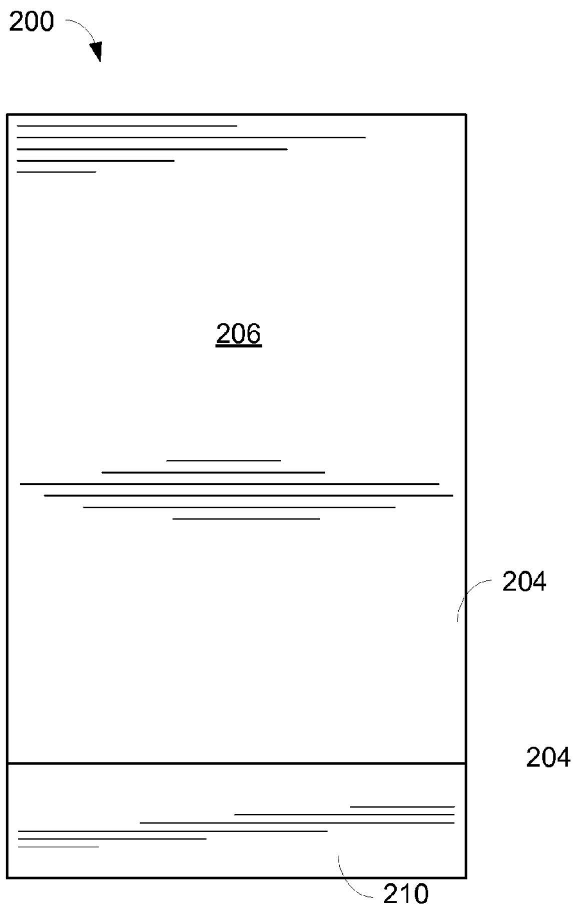
FIG. 16 is a front elevational view of the first head component of FIG. 15.
Figure 17:
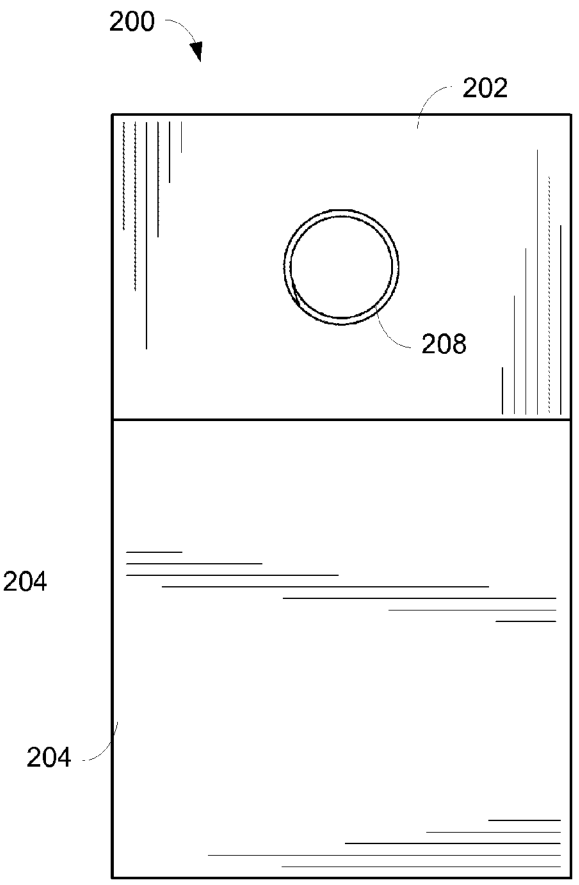
FIG. 17 is a rear elevational view of the first head component of FIG. 15.
Figure 18:
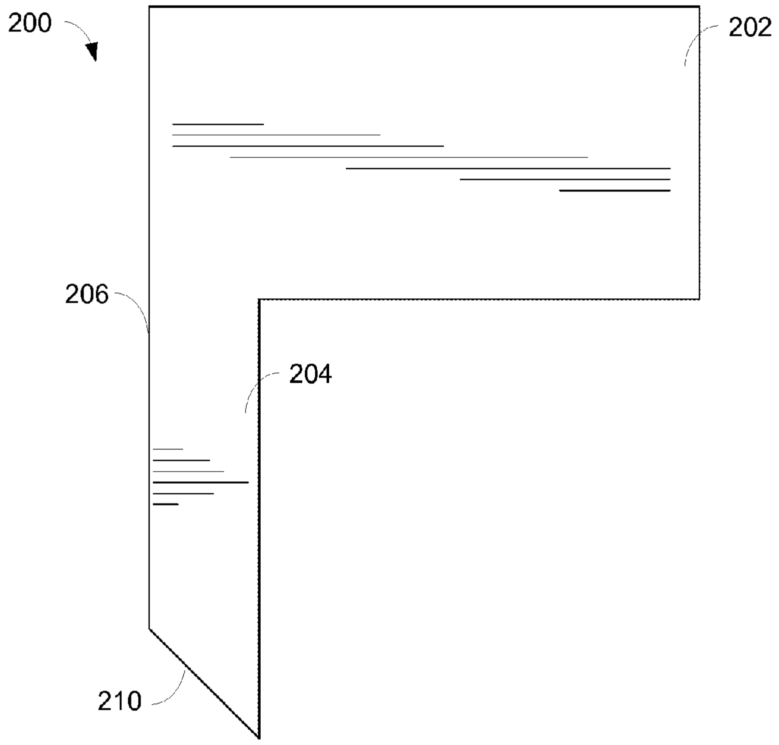
FIG. 18 is a side elevational view of the first head component of FIG. 15.
Figure 19:
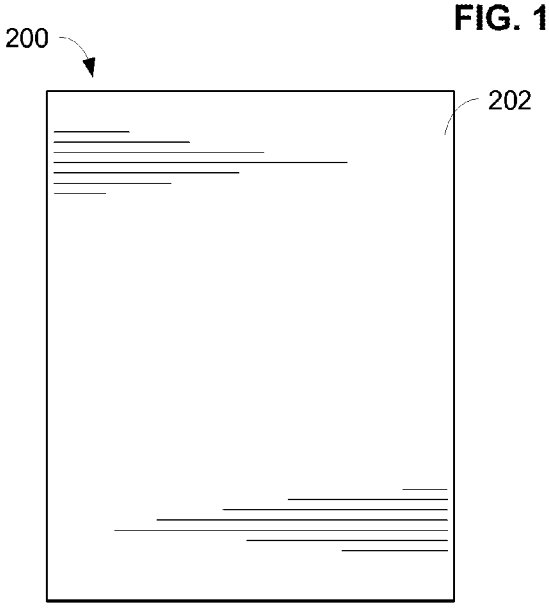
FIG. 19 is a top plan view of the first head component of FIG. 15.
Figure 20:
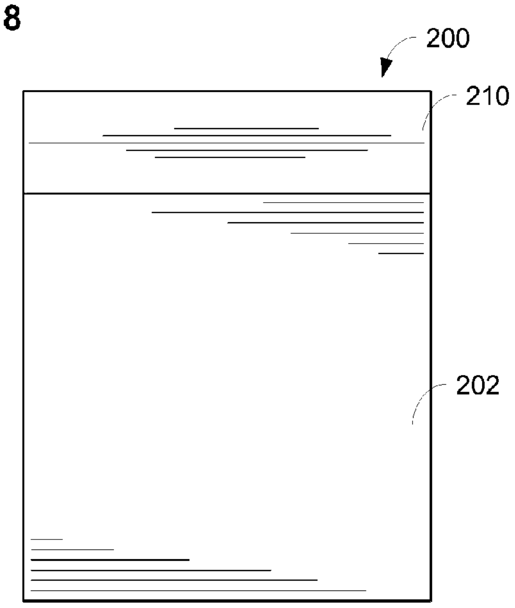
FIG. 20 is a bottom plan view of the first head component of FIG. 15.
Figure 21:
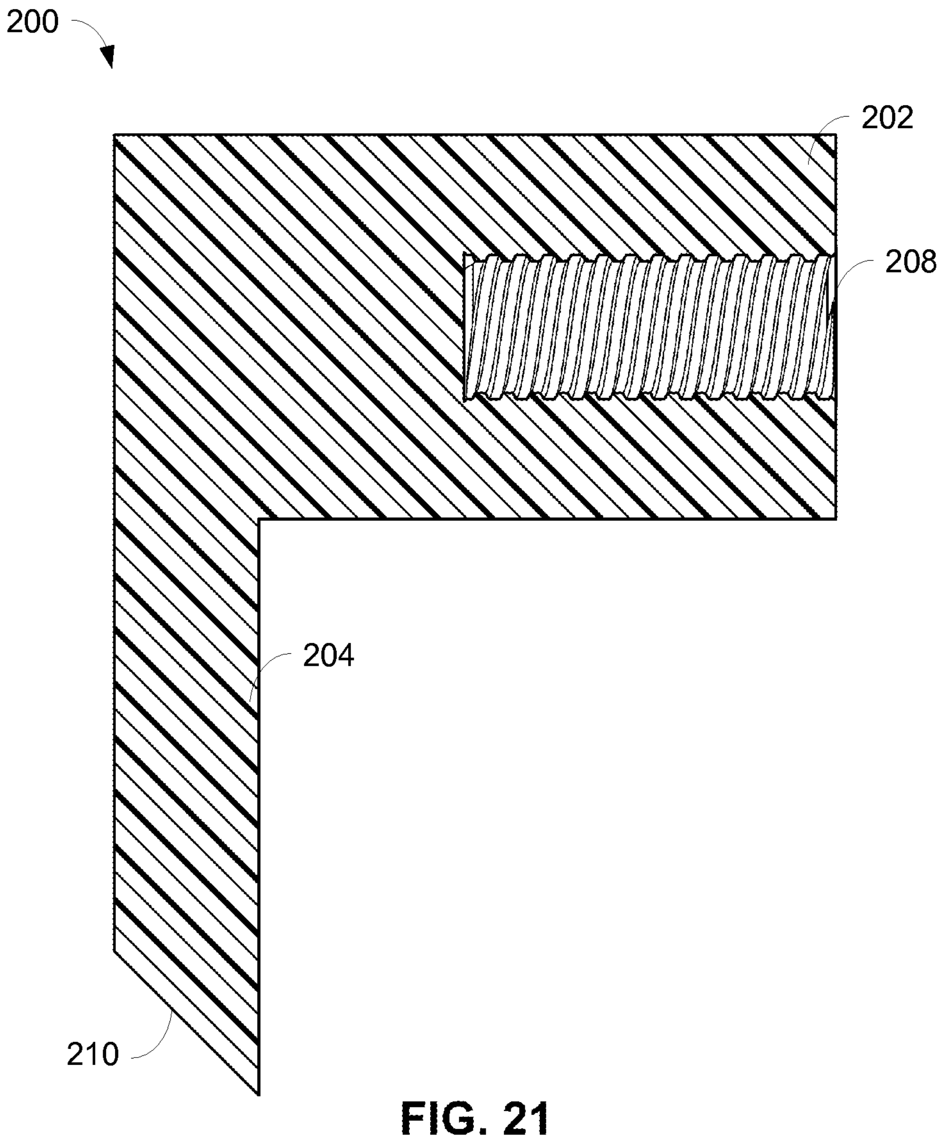
FIG. 21 is a cross-sectional side view of the first head component of FIG. 15.
Figure 22:
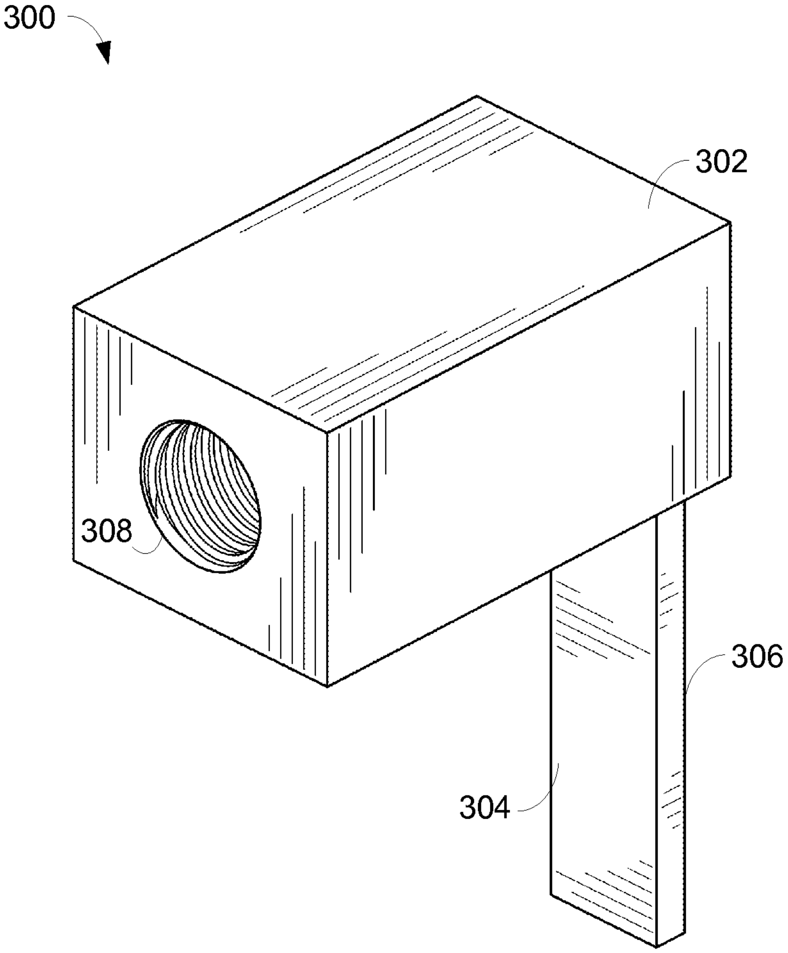
FIG. 22 is a perspective view of an embodiment of a second head component of a push-pull tool.
Figure 23:
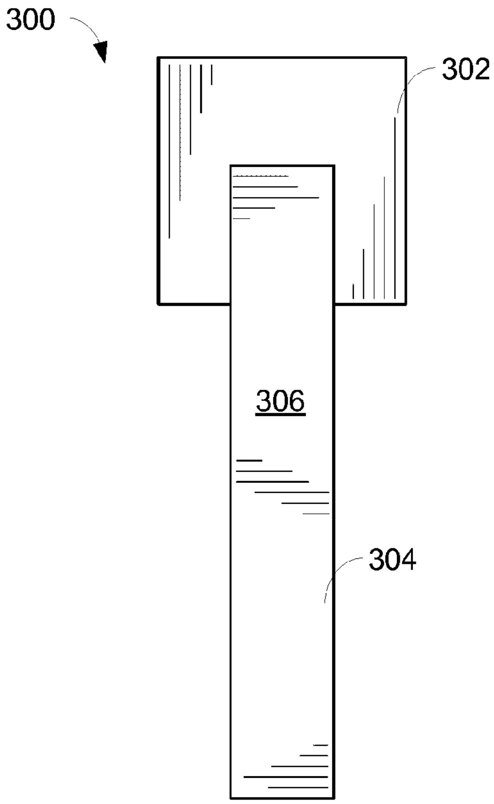
FIG. 23 is a front elevational view of the second head component of FIG. 22.
Figure 24:
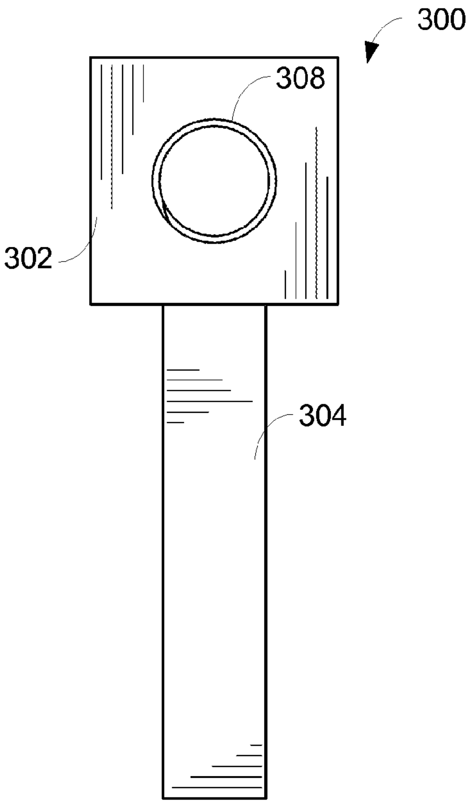
FIG. 24 is a rear elevational view of the second head component of FIG. 22.
Figure 25:
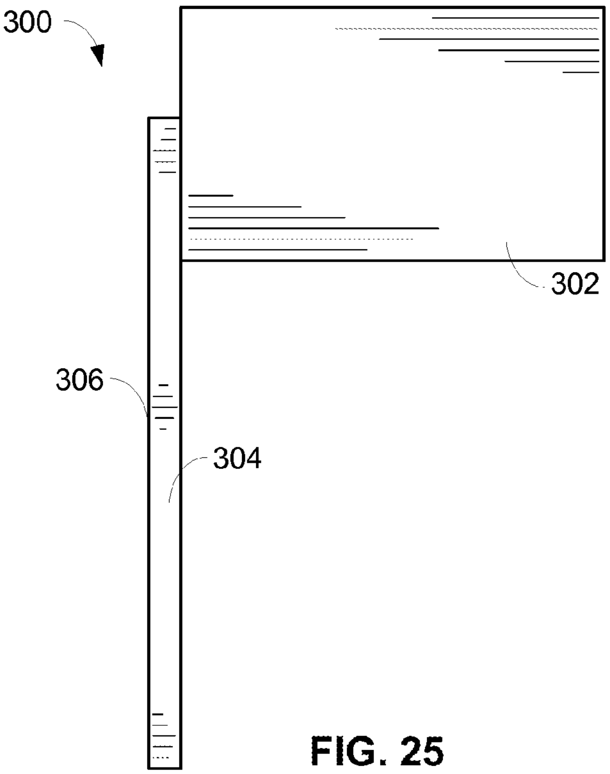
FIG. 25 is a side elevational view of the second head component of FIG. 22.
Figure 26:
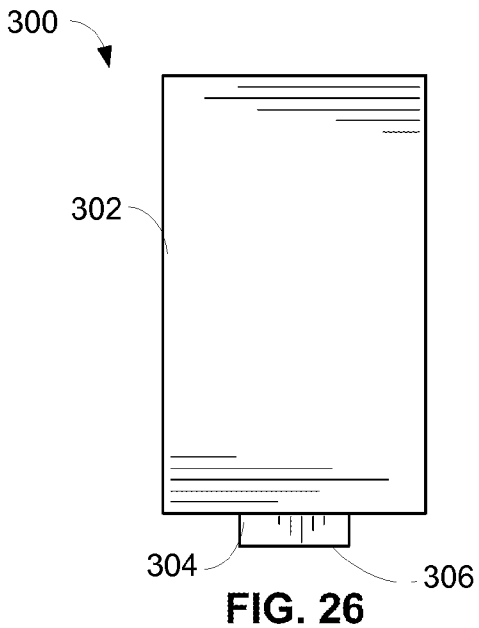
FIG. 26 is a top plan view of the second head component of FIG. 22.
Figure 27:
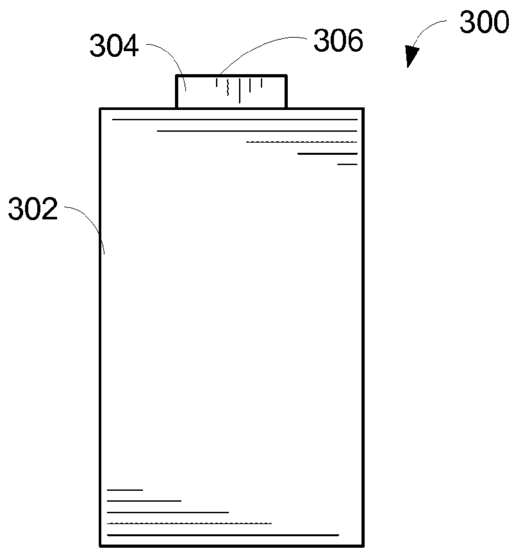
FIG. 27 is a bottom plan view of the second head component of FIG. 22.

An outer-facing surface 206 of the transverse portion 204 of the head component 200 may be utilized to contact, push, and move objects. The surface 206 may be of a suitable size to allow the head component 200 to be able to effectively contact, push, and move such objects, and in particular, relatively large and/or heavy objects. The transverse portion 204 may have a bottom end 210 that is angled, as best shown in FIGS. 15, 18, and 21. The angled bottom end 210 may enable the head component 200 to, for example, be wedged between a wall of the cargo area and an object to be moved; be wedged between multiple objects; move and push certain types of objects (e.g., bags filled with soft material such as dirt); and/or be used to hook onto certain types of objects.

FIGS. 5-8 show various views of an embodiment of a push-pull tool 20 having a handle 100 that is removably attached to a head component 300. In particular, the push-pull tool 20 is shown in a perspective view in FIG. 5, in a top plan view in FIG. 6, in a side elevational view in FIG. 7, and in a bottom plan view in FIG. 8. A user may use the push-pull tool 20 to push and move objects by holding the handle 100 to manipulate the head component 300 to contact the objects with an outer-facing surface 306 of the head component 300. Compared to the head component 200 of the push-pull tool 10 described above in FIGS. 1-4, the head component 300 of the push-pull tool 20 may be relatively smaller and lighter. As such, the push-pull tool 20 including the head component 300 may be utilized, for example, in smaller or tighter cargo areas that have less room to maneuver the push-pull tool 20, and/or for use by persons with physical, strength, and/or mobility issues.

The head component 300 of the push-pull tool 20 is shown without the handle 100 attached in various views in FIGS. 22-28. In particular, the head component 300 is shown in a perspective view in FIG. 22, a front elevational view in FIG. 23, a rear elevational view in FIG. 24, a side elevational view in FIG. 25, a top plan view in FIG. 26, a bottom plan view in FIG. 27, and a cross-sectional side view in FIG. 28. The head component 300 may include a horizontal portion 302 and a transverse portion 304 that extends from the horizontal portion 302. The transverse portion 304 may extend generally perpendicularly from the horizontal portion 302, for example, or may extend at a different angle from the horizontal portion 302.

The horizontal portion 302 may include female threading 308 which mates with the male threading 108 of the handle 100 to attach the handle 100, as best shown in FIGS. 5, 22, 24, and 28. The female threading 308 may be of a suitable depth to match the length of the male threading 108, and to ensure secure attachment of the head component 300 with the handle 100. In some embodiments, the female threading 308 may be a threaded receiver, and in other embodiments, the female threading 308 may be machined into the head component 300. The horizontal portion 302 may primarily be composed of non-marring plastic.

Figure 28:
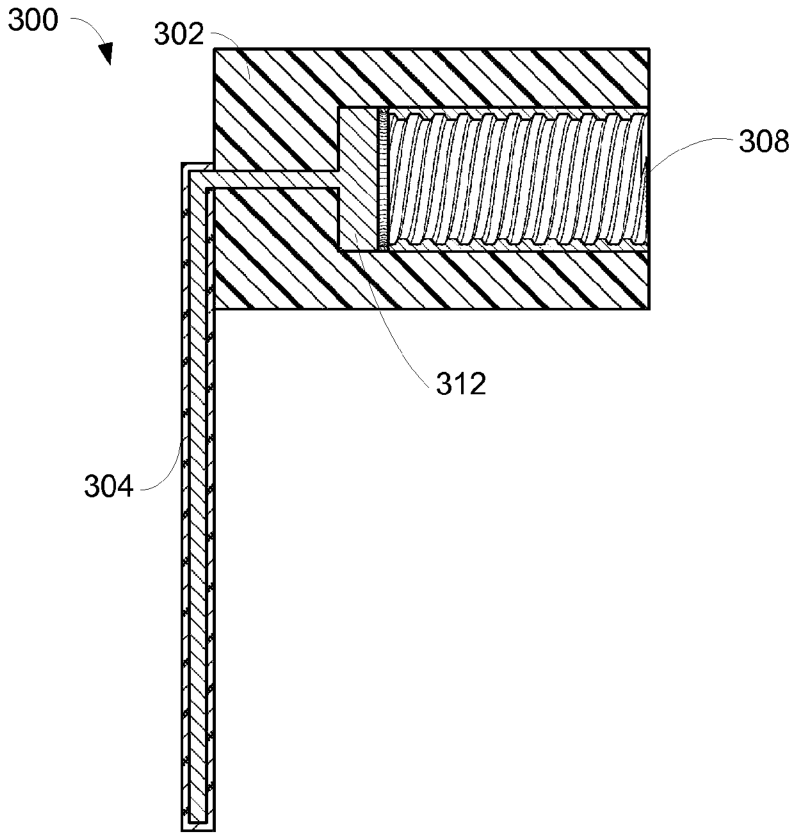
FIG. 28 is a cross-sectional side view of the second head component of FIG. 22.
Figure 29:
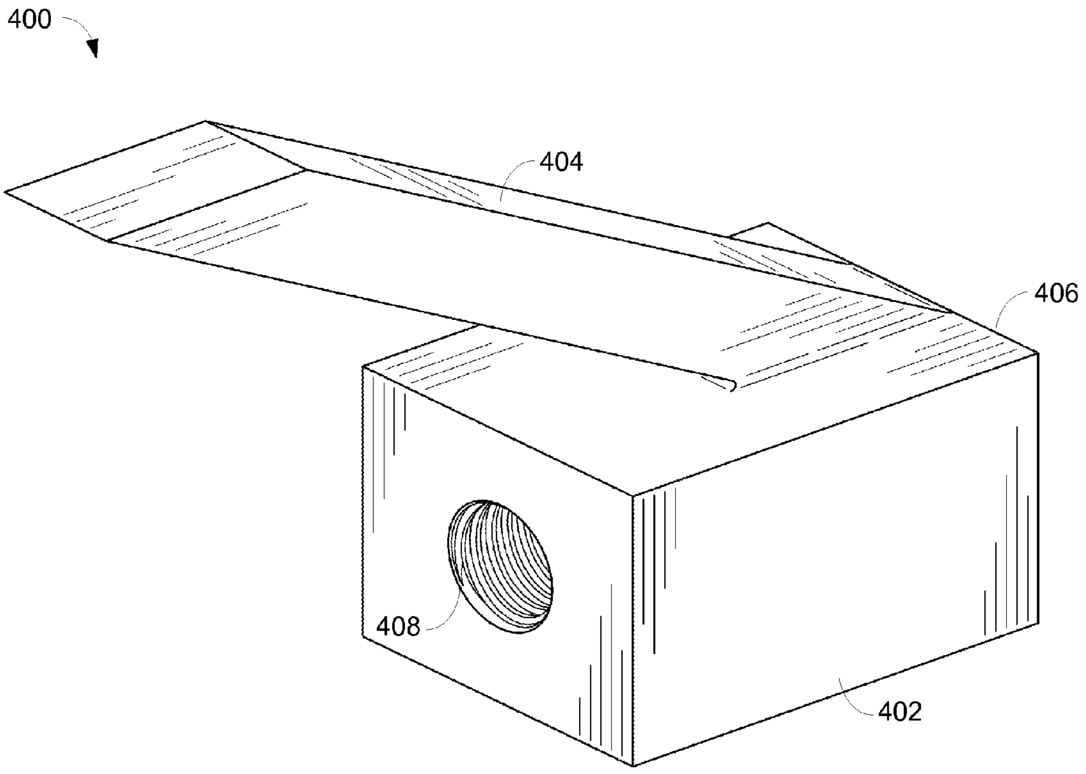
FIG. 29 is a perspective view of an embodiment of a hook component of a push-pull tool.
Figure 30:
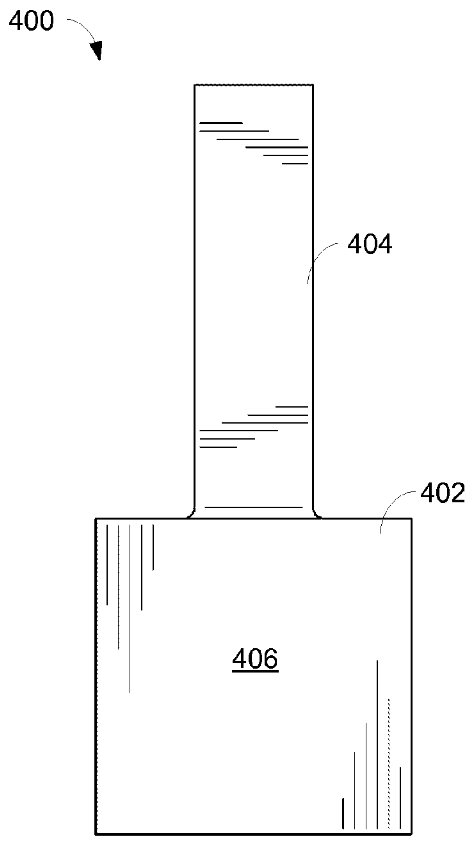
FIG. 30 is a front elevational view of the hook component of FIG. 29.
Figure 31:
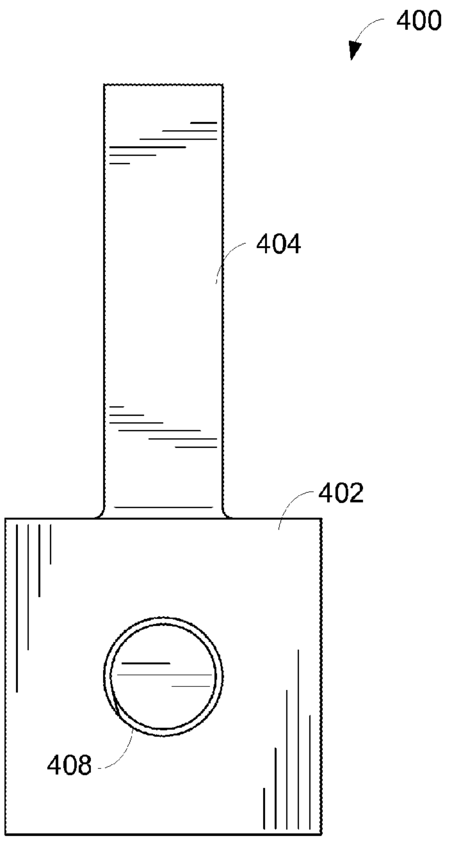
FIG. 31 is a rear elevational view of the hook component of FIG. 29.
Figure 32:
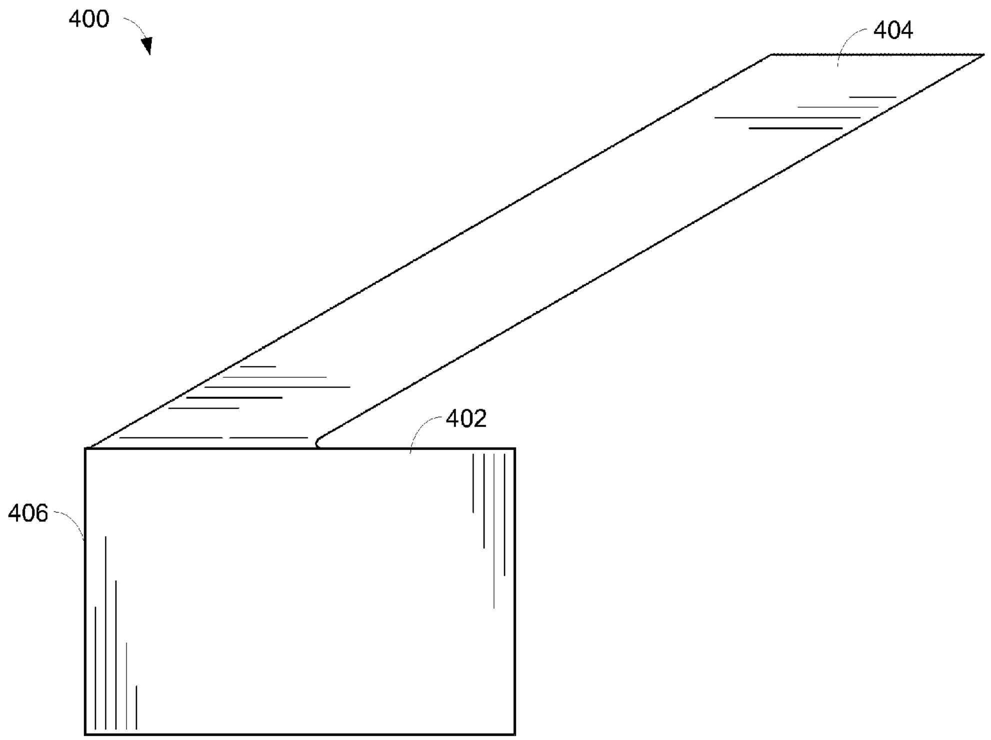
FIG. 32 is a side elevational view of the hook component of FIG. 29.
Figure 33:
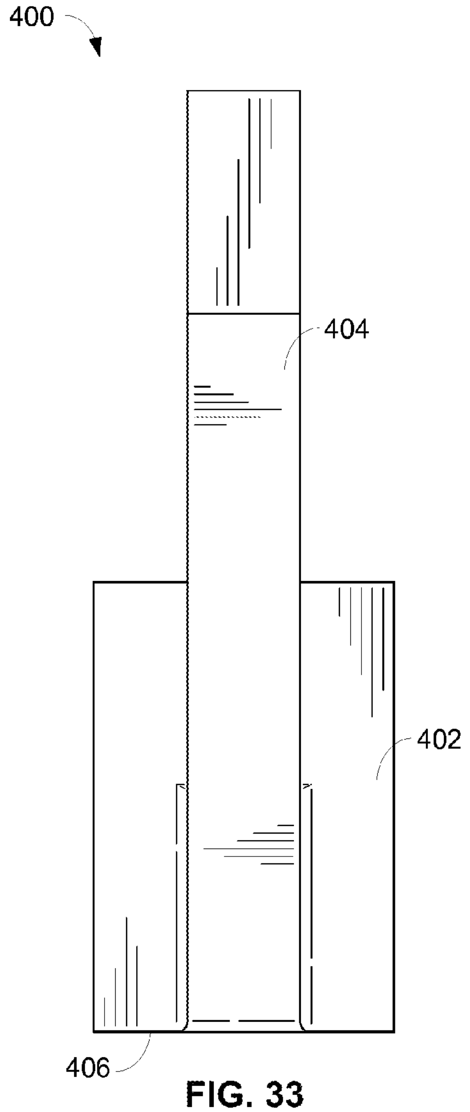
FIG. 33 is a top plan view of the hook component of FIG. 29.
Figure 34:
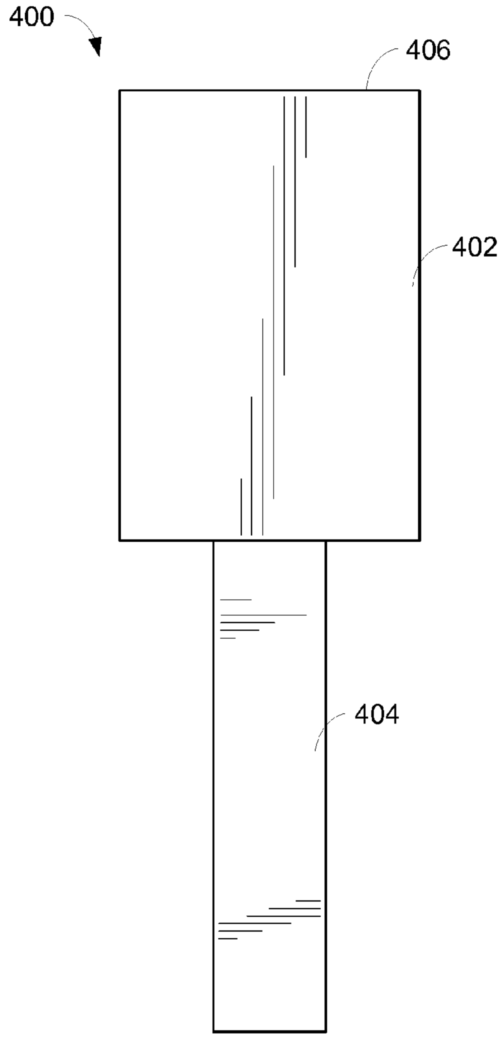
FIG. 34 is a bottom plan view of the hook component of FIG. 29.
Figure 35:
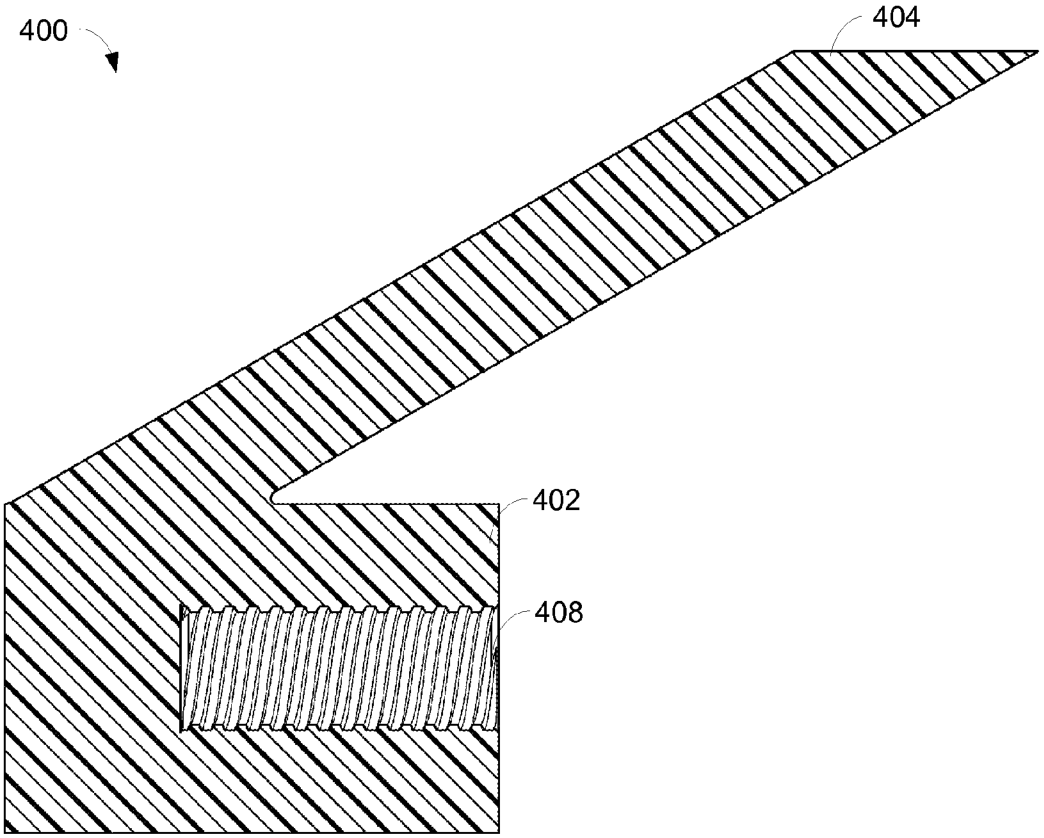
FIG. 35 is a cross-sectional side view of the hook component of FIG. 29.

The female threading 308 may be attached to a member 312 within the horizontal portion 302 of the head component 300, as best seen in the cross-sectional side view of FIG. 28. The member 312 may be composed of metal or another suitable material. The female threading 308 may be attached to the member 312 using tack welding or other suitable attachment methods. The member 312 may also form at least part of the transverse portion 304 of the head component 300. The transverse portion 304 may be covered with non-marring plastic, in some embodiments, so that the exterior surfaces of the head component 300 that comes into contact with objects and the vehicle cargo area are non-marring plastic. The strength, stability, and durability of the push-pull tool 20 including the head component 300 may be enhanced through the use of the member 312 as part of the transverse portion 304 and attached to the female threading 308 within the horizontal portion 302.

An outer-facing surface 306 of the transverse portion 304 of the head component 300 may be utilized to contact, push, and move objects. The surface 306 may be of suitable size to allow the head component 300 to be able to effectively contact, push, and move such objects, and in particular, relatively smaller and/or lighter objects. The transverse portion 304 may also be used to hook onto certain types of objects, such as bag handles, for example. By being relatively smaller than the transverse portion 204 of the head component 200 described previously, the transverse portion 304 of the head component 300 may be more easily maneuverable in smaller or tighter cargo areas, for example.

FIGS. 9-12 show various views of an embodiment of a push-pull tool 30 having a handle 100 that is removably attached to a hook component 400. In particular, the push-pull tool 30 is shown in a perspective view in FIG. 9, in a top plan view in FIG. 10, in a side elevational view in FIG. 11, and in a bottom plan view in FIG. 12. A user may use the push-pull tool 30 to pull and move objects by holding the handle 100 to manipulate the hook component 400 to hook onto the objects with a transverse portion 404.

The hook component 400 of the push-pull tool 30 is shown without the handle 100 attached in various view in FIGS. 29-35. In particular, the hook component 400 is shown in a perspective view in FIG. 29, a front elevational view in FIG. 30, a rear elevational view in FIG. 31, a side elevational view in FIG. 32, a top plan view in FIG. 33, a bottom plan view in FIG. 34, and a cross-sectional side view in FIG. 35. The hook component 400 may include a horizontal portion 402 and a transverse portion 404 that extends at an angle from the horizontal portion 402. In some embodiments, the horizontal portion 402 may be integral with the transverse portion 404. In other embodiments, the horizontal portion 402 may be formed separately from the transverse portion 404. The hook component 400 may be composed of non-marring plastic to protect the object and surfaces of the vehicle cargo area that the hook component 400 may come in contact with. In some embodiments, the hook component 400 may be composed of metal or another suitable material.

The horizontal portion 402 may include female threading 408 which mates with the male threading 108 of the handle 100 to attach the handle 100, as best shown in FIGS. 9, 29, 31, and 35. The female threading 408 may be of a suitable depth to match the length of the male threading 108, and to ensure secure attachment of the hook component 400 with the handle 100. In some embodiments, the female threading 408 may be a threaded receiver, and in other embodiments, the female threading 408 may be machined into the hook component 400.

The transverse portion 404 of the hook component 400 may be utilized to hook onto, pull, and move objects. In particular, the transverse portion 404 may have a length that is greater than the horizontal portion 402 to enable a user of the push-pull tool 30 to more easily hook onto objects. The transverse portion 404 is shown as being relatively narrow and having a polygonal shape with a squared off end. However, other widths, shapes (e.g., round, pointed, etc.), and/or ends (e.g., rounded, pointed, etc.) of the transverse portion 404 are possible and contemplated. An outer-facing surface 406 of the horizontal portion 402 may also enable the hook component 400 to move and push objects. In some embodiments, the transverse portion 404 may have additional support between the transverse portion 404 and the horizontal portion 402, such as with molding or other material.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A tool, comprising:

a handle comprising an elongated shaft having an attachment portion on a first end, wherein the handle defines a longitudinal axis of the tool; and a component detachably connectable to the handle, comprising:

a horizontal portion comprising a rectangular prismatic shape and a receiving socket that is detachably connectable to the attachment portion of the handle, wherein the receiving socket opens on a first surface of the horizontal portion and is in-line with the handle along the longitudinal axis of the tool; and a transverse portion extending from the horizontal portion and transverse to the longitudinal axis of the tool, the transverse portion having a second surface substantially parallel to and opposite of the first surface;

wherein the horizontal portion of the component comprises a member attached to the receiving socket; and wherein the transverse portion of the component is attached to the member.

2. The tool of claim 1, wherein:

the attachment portion of the handle comprises male threading formed on the first end of the shaft; and the receiving socket comprises female threading that is mateable with the male threading so that the component is detachably connectable to the handle.

3. The tool of claim 1, wherein the handle further comprises a hangable opening extending from a second end of the handle opposite of the first end.

4. The tool of claim 1, wherein the handle further comprises a graspable portion composed of a grip material.

5. The tool of claim 1, wherein:

a width of the horizontal portion is greater than or equal to a width of the transverse portion; and a height of the horizontal portion is less than a height of the transverse portion.

6. The tool of claim 1, wherein:

the horizontal portion has an outer surface radially offset from the longitudinal axis; and the horizontal portion has a non-uniform thickness between the receiving socket and the outer surface.

7. The tool of claim 1, wherein a bottom end of the transverse portion of the component has an angled surface that is angled away from the second surface of the transverse portion.

8. A tool, comprising:

a handle comprising an elongated shaft having an attachment portion on a first end, wherein the handle defines a longitudinal axis of the tool; and a component detachably connectable to the handle, comprising:

a horizontal portion comprising a rectangular prismatic shape and a receiving socket that is detachably connectable to the attachment portion of the handle, wherein the receiving socket opens on a first surface of the horizontal portion and is in-line with the handle along the longitudinal axis of the tool; and a transverse portion extending from the horizontal portion and transverse to the longitudinal axis of the tool, the transverse portion having a second surface substantially parallel to and opposite of the first surface;

wherein the horizontal portion of the component comprises a member attached to the receiving socket; and wherein the transverse portion of the component comprises the member.

9. The tool of claim 8, wherein:

the attachment portion of the handle comprises male threading formed on the first end of the shaft; and the receiving socket comprises female threading that is mateable with the male threading so that the component is detachably connectable to the handle.

10. The tool of claim 8, wherein the handle further comprises a hangable opening extending from a second end of the handle opposite of the first end.

11. The tool of claim 8, wherein the handle further comprises a graspable portion composed of a grip material.

12. The tool of claim 8, wherein:

a width of the horizontal portion is greater than or equal to a width of the transverse portion; and a height of the horizontal portion is less than a height of the transverse portion.

13. The tool of claim 8, wherein:

the horizontal portion has an outer surface radially offset from the longitudinal axis; and the horizontal portion has a non-uniform thickness between the receiving socket and the outer surface.

14. The tool of claim 8, wherein a bottom end of the transverse portion of the component has an angled surface that is angled away from the second surface of the transverse portion.

15. A tool, comprising:

a handle comprising an elongated shaft having an attachment portion on a first end, wherein the handle defines a longitudinal axis of the tool; and a component detachably connectable to the handle, comprising:

a horizontal portion comprising a receiving socket that is detachably connectable to the attachment portion of the handle, wherein the receiving socket opens on a first surface of the horizontal portion and is in-line with the handle along the longitudinal axis of the tool; and a transverse portion extending from the horizontal portion and transverse to the longitudinal axis of the tool, the transverse portion having a second surface substantially parallel to and opposite of the first surface;

wherein:

the component is composed of a non-marring plastic material;

the receiving socket is composed of a metal material; and the transverse portion of the component comprises a member composed of a metal material that is covered with a non-marring plastic material.

16. The tool of claim 15, wherein:

the attachment portion of the handle comprises male threading formed on the first end of the shaft; and the receiving socket comprises female threading that is mateable with the male threading so that the component is detachably connectable to the handle.

17. The tool of claim 15, wherein the handle further comprises a hangable opening extending from a second end of the handle opposite of the first end.

18. The tool of claim 15, wherein the handle further comprises a graspable portion composed of a grip material.

19. The tool of claim 15, wherein:

a width of the horizontal portion is greater than or equal to a width of the transverse portion; and a height of the horizontal portion is less than a height of the transverse portion.

20. The tool of claim 15, wherein:

the horizontal portion has an outer surface radially offset from the longitudinal axis; and the horizontal portion has a non-uniform thickness between the receiving socket and the outer surface.

* * * * *